United States Patent [19]

Pierce, Jr.

[11] 4,230,299
[45] Oct. 28, 1980

[54] PRESSURE BALANCED GATE VALVE HAVING SELECTIVE ACTUATOR SYSTEMS

[75] Inventor: Elwood K. Pierce, Jr., Coldspring, Tex.

[73] Assignee: Petroleum Designers, Inc., Houston, Tex.

[21] Appl. No.: 921,824

[22] Filed: Jul. 3, 1978

[51] Int. Cl.² .................................... F16V 31/143
[52] U.S. Cl. ...................... 251/14; 137/315; 251/63; 251/63.6; 251/214; 251/282; 251/326; 251/330
[58] Field of Search ............... 137/315; 251/62, 63, 251/63.6, 214, 282, 326, 330, 14

[56] References Cited

U.S. PATENT DOCUMENTS

| | | | |
|---|---|---|---|
| Re. 29,322 | 7/1977 | Nelson | 251/14 |
| 2,668,034 | 2/1954 | Konwal | 251/330 |
| 2,991,042 | 7/1961 | Natho | 251/14 |
| 3,029,060 | 4/1962 | Anderson | 251/14 |
| 3,188,049 | 6/1965 | Zawacki et al. | 251/282 |
| 3,378,224 | 4/1968 | Boyle | 251/14 |
| 3,789,875 | 2/1974 | McGee | 251/14 |
| 3,842,854 | 10/1974 | Wicke | 251/14 |
| 3,933,338 | 1/1976 | Herd et al. | 251/63.6 |
| 4,029,294 | 6/1977 | McCaskill et al. | 251/282 |

Primary Examiner—Martin P. Schwadron
Assistant Examiner—G. L. Walton
Attorney, Agent, or Firm—James L. Jackson

[57] ABSTRACT

A pressure balanced gate valve mechanism wherein a closed loop fluid interchange system interconnects the valve actuator stem area of the valve mechanism with the pressure balancing stem area and functions to accomodate volumetric changes to prevent the development of a hydraulic lock that might otherwise prevent or retard opening and closing movement of the valve mechanism. Internal back-face seating arrangements with combination metal-to-metal and elastomeric sealing elements establish seals between the valve stem and bonnet at one gate position and between the pressure balancing stem and valve body structure at the opposite gate position. An externally threaded portion of the valve bonnet is receivable within internally threaded receiver openings of a plurality of different actuator systems, including manual, mechanical, hydraulic and pneumatic actuator systems. The actuator systems are field interchangeable with the valve in service and under pressure. The valve mechanism is capable of being hydraulically energized by portable hydraulic equipment for moving the valve mechanism to a predetermined position in the event the primary drive system should become inoperative for any reason.

26 Claims, 7 Drawing Figures

PRESSURE BALANCED GATE VALVE HAVING SELECTIVE ACTUATOR SYSTEMS

FIELD OF THE INVENTION

This invention relates generally to valve mechanisms for controlling the flow of fluid in flow lines such as the production tubing and flow lines of wellheads, for example. More particularly, the invention is directed to a pressure balanced gate valve mechanism such as might be operated by mechanical, hydraulic or pneumatic apparatus for moving a gate element between open and closed positions for controlling the flow of fluid through the valve mechanism.

BACKGROUND OF THE INVENTION

It is well recognized that pressure balanced-type gate valves have been in use for many years. The pressure balancing concept is employed to prevent the development of pressure induced forces that would retard the operability of the valve mechanism. In most gate valves, the fluid pressure controlled by the valve acts upon the cross-sectional area defined by the valve stem and develops a force acting upon the valve stem that tends to move the gate element toward one of its extreme positions of movement. This force can be sufficiently great, depending upon the pressure within the valve and cross-sectional area of the valve stem, that the actuator system needed for controlling the valve must be of quite heavy duty and expensive nature. When pressure induced forces are extremely great and the valve mechanism is of the manually operated type, it can be extremely difficult for personnel to operate the valve.

By providing a pressure balancing stem connected to the gate element and extending through the valve body with one extremity thereof exposed to the atmosphere, fluid pressure acting on the cross-sectional area of the pressure balancing stem will develop a pressure induced force that counter-balances the force applied to the valve stem. The gate element may therefore be operated by simply overcoming the frictional forces of the gate, valve seats and packings. Even while maintained under extremely high pressure conditions, pressure balanced valves may be readily opened and closed while applying only mininal forces during such opening and closing movement.

Pressure balanced valves generally include a pressure balancing system wherein the pressure balancing stem is exposed to the atmosphere. In the event valves of this nature are employed in underwater service, it is possible that marine growth and other normal conditions of a marine environment might foul the valve mechanism by means of the pressure balancing opening. Pressure balanced valves are therefore seldom utilized in marine environment unless provided with an oil/water interface system or some other protective mechanism to prevent sea water from coming into contact with the pressure balancing portion of the valve mechanism. It is desirable, therefore, to provide a pressure balanced gate valve mechanism incorporating a pressure balancing system that is not exposed to the hazards of the environment within which it might be located.

Valve mechanisms, including pressure balanced valves mechanisms, are at times provided with back-face seating arrangements so as to establish a seal between the valve stem and bonnet structure of the valve mechanism when desired. For example, should it be necessary to replace the packing assembly of a gate valve while the valve structure is maintained under pressure and in service, a sealing surface provided on the valve stem may be brought into metal-to-metal sealing contact with an appropriate mating seat formed within the bonnet structure. With this metal-to-metal seal established, the packing assembly can be replaced so as to prevent any leakage between the valve stem and bonnet. It is desirable to provide a back-face seating system for the valve mechanism including back-face seating between the valve stem and bonnet structure and between the pressure balancing stem and the valve body structure. It is also desirable to provide stop means for limiting travel of the gate element such that in the open position the port of the gate element is precisely registered with the flow passages of the valve so as to provide a through conduit type valve structure that can accomodate passage of production tools and equipment that might be passed through the valve mechanism. It is also desirable to provide a back face seating arrangement whereby the valve actuator mechanism may be immobilized and back-face seating can be accomplished regardless of the position of the gate element within the valve mechanism.

Where safety override systems are employed, such as are utilized to move the gate element to a predetermined position responsive to the occurence of a condition such as failure of the power system of the valve, for example, it may be desirable to move the gate element to the open or closed position. It is desirable therefore to provide a gate element that is positionable within the valve mechanism such that the gate is either open or closed responsive to movement thereof to the predetermined position by the safety override system. It is therefore desirable to provide a gate element that is reversible to selectively position the port at the open or closed position when energized by the safety override system.

At times, even when manual actuators are employed, the actuator system may become inoperative due to mechanical problems. It is desirable, therefore, to provide means for imparting controlling movement to the gate element to move the gate to a preselected position by means of a hydraulic auxiliary actuator system.

In many cases, valves are provided for controlling flow lines and the valves are provided with a particular kind of actuating system. In the event it is desirable to provide the valve mechanism with a different kind of actuator system, it may be necessary to disconnect the valve from the line and transport it to a repair facility in order that it can be adapted for receiving a different kind of actuator. It is desirable to provide a valve mechanism that is adapted to accept a wide range of actuator systems including manual, mechanical, hydraulic and pneumatic systems and to provide for field interchange of valve actuator systems without necessitating removal of the valve from the line. It is also desirable to provide valve actuator systems that can be simply and easily installed and removed without necessitating disconnection of hydraulic or pneumatic supply lines in the event the actuator system is provided for pneumatic or hydraulic actuation.

In view of the foregoing, it is an important feature of the present invention to provide a valve mechanism incorporating a standard actuator connection system that effectively promotes connection of any one of several different types of valve actuators to the valve mechanism and to accomplish removal and replacement of actuator systems while the valve is maintained in service and under pressure.

It is another feature of the present invention to provide a novel balanced stem type gate valve mechanism having a pneumatic or hydraulic actuator system therefor wherein the actuator system may be removed from the valve mechanism and replaced without requiring disconnection of hydraulic or pneumatic control lines.

It is another feature of the present invention to provide a novel gate valve mechanism that is adapted for actuation by a number of different types of actuator systems and wherein a hydraulic override system is provided enabling the gate of the valve mechanism to be moved to a predetermined position by a portable hydraulic actuator system.

Among the several features of the present invention is noted the contemplation of a novel pressure balanced gate valve mechanism incorporating back-face seal systems for both the actuating stem and pressure balancing stem to enable replacement of packings while the valve is in service and under pressure.

It is also a feature of the present invention to provide a novel pressure balanced gate valve mechanism wherein elastomeric seals are utilized to enhance the sealing ability of metal-to-metal back-face seals with which the valve mechanism is provided.

Another feature of the present invention contemplates the provision of a novel pressure balanced gate valve mechanism incorporating a reversible gate for positioning of the gate port either in open or closed position responsive to automatic movement of the gate to a preselected position by a safety override system.

It is another feature of the present invention to provide a novel pressure balanced gate valve mechanism that is capable of establishing back-face sealing regardless of the initial position of the gate and valve stem elements at the initiation of movement toward the back-face sealing position.

It is another important feature of the present invention to provide a novel pressure balanced gate valve mechanism incorporating a closed loop fluid interchange system that allows a pressure balanced condition to be established and prevents venting of the pressure balancing stem or valve stem to the atmosphere.

Other and further objects advantages and features of the present invention will become apparent to one skilled in the art upon consideration of this entire disclosure. The form of the invention, which will now be described in detail, illustrates the general principles of the invention but it is to be understood that this detailed description is not to be taken as limiting the scope of the present invention.

SUMMARY OF THE INVENTION

A pressure balanced gate valve mechanism, according to the present invention, includes a valve body having a bonnet closure with the body defining a valve chamber within which is located seat assemblies and a gate element that is movable between open and closed positions to control the flow of fluid through the valve. The bonnet and valve body structures are formed to define tapered back-face seat surfaces that are engaged, respectively, by back-face sealing surfaces formed on the valve stem and on the pressure balancing stem to achieve back-face sealing when the gate element is at its maximum position of travel in either direction. The back-face sealing capability of the valve mechanism is enhanced by providing elastomeric seal engagement with the back-face seat surfaces simultaneously with the establishment of metal-to-metal sealing contact.

The bonnet structure of the valve mechanism is formed to define an elongated threaded section that receives the internally threaded portion of a bearing retainer cap or valve actuator, as the case may be. The elongated threaded section allows substantial linear movement of the valve cap or valve actuator without disassembling it from the bonnet structure. This linear movement is sufficient to allow back-face seating to occur between the valve stem and bonnet regardless of whether the gate element is initially in the open or closed position prior to movement toward back-face sealing contact.

The valve mechanism is also provided with a closed loop fluid interchange system allowing transfer of fluid between the outer extremities of the valve actuating stem and pressure balancing stem, thus allowing a pressure balanced condition to be established and preventing a pressure lock condition from occuring that might otherwise retard or prevent actuation of the valve mechanism. The closed loop fluid interchange system also prevents contact between the environment in which the valve is located and the inner portions of the valve actuator and pressure balancing systems of the valve mechanism.

The bonnet structure of the valve mechanism is provided for selective connection to one of a number of different types of valve actuators that are designed specifically for quick and simple attachment to the valve mechanism. In most cases, selective connection and disconnection of various valve actuating systems from the valve mechanism may be accomplished without necessitating disconnection or removal of hydraulic or pneumatic supply systems that might be provided therefor. The valve mechanism may be provided with a simple handwheel type mechanical actuator in the event such is desired or, in the alternative, may be provided with hydraulic or pneumatic actuator systems. The hydraulic or pneumatic atuator systems may also be provided with a spring return type fail-safe system thereby enabling the gate of the valve mechanism to be shifted to a predetermined safe position responsive to the occurence of a predetermined condition, such as power failure, for example.

Regardless of the type of actuator provided for imparting operational movement to the valve mechanism, the valve mechanism may also be provided with a hydraulic override system that enables the gate element to be shifted to a predetermined position by means of energy provided by an auxiliary or portable hydraulic actuator that may be simply and quickly connected to the valve mechanism. The primary actuator system is subject to being immobilized, thereby providing for actuation of the gate mechanism by the auxiliary valve actuator. In the case of a spring return fail-safe type valve and actuator mechanism, an auxiliary type valve actuator system may be employed to enhance the spring force in moving the gate element to its predetermined safe position.

Preferred embodiments of the invention have been chosen for purposes of illustration and description and are shown in the accompanying drawings forming a part of this specification wherein.

DETAILED DESCRIPTION OF PREFERRED EMBODIMENTS

Figure 1:
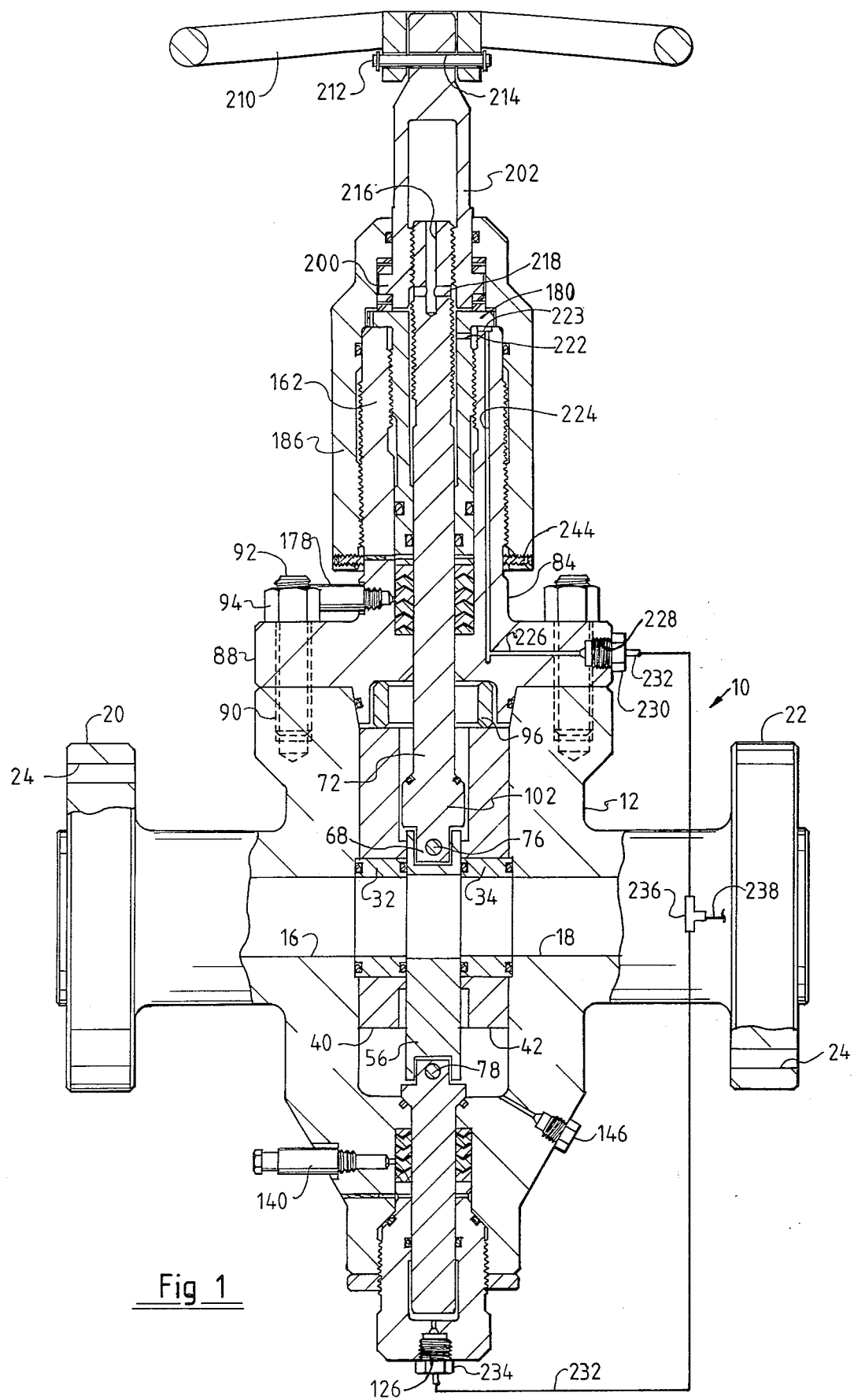
FIG. 1 is a sectional view of a pressure balanced gate valve mechanism constructed in accordance with the present invention and illustrating the provision of a simple manual type valve actuating system such as might be employed.
Figure 2:
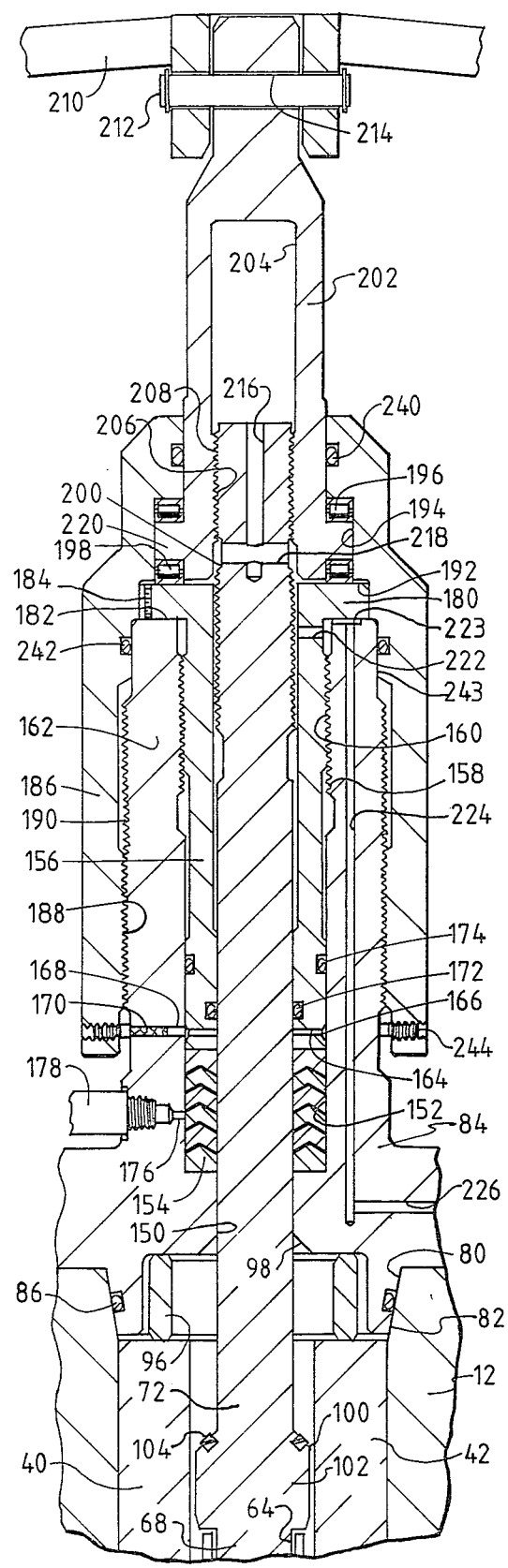
FIG. 2 is a sectional view of the upper portion of FIG. 1 illustrating the valve actuator mechanism thereof and showing the bearing retainer cap being positioned at its fully seated position for normal operation of the valve mechanism.

Referring now to the drawings and first to FIG. 1, there is shown a gate valve mechanism generally at 10 comprising a valve body 12 that is formed to define a valve chamber 14 and inlet and outlet flow passages 16 and 18 that intersect the valve chamber. The valve body structure also defines connection flanges 20 and 22 having a plurality of apertures 24 formed therein through which bolts or studs extend for bolted connection of the valve into a flanged flow line, wellhead or other flanged structure through which pressurized fluid is to flow. Obviously, the valve body structure may be provided with threaded connection means, a clamping system, welded connection means or any other suitable form of connection within the spirit and scope of the present invention.

The valve chamber 14 is defined in part by a generally cylindrical wall 26 thereby causing the valve chamber 14 to be of generally cylindrical configuration. Seat recesses 28 and 30 are formed internally of the valve body and are adapted to receive valve seat elements 32 and 34, respectively. Seat elements 32 and 34 are floating type seats and are formed to define annular grooves at one extremity thereof for receiving annular face seal rings 36 while the opposite extremity of each sealing element receives rear sealing elements 38 in appropriately formed annular grooves. The sealing elements 36 and 38 may be formed of any one of a number of suitable sealing materials, such as viton, polytetrafluoroethylene, etc., depending upon the type and characteristics of the fluid to be controlled. It is desirable to provide means for positively supporting the seat elements 32 and 34 within the valve chamber 14 and, according to the present invention, such means of support may be provided by a pair of seat carrier elements 40 and 42. The seat carrier elements are formed to define partially cylindrical outer surfaces 44 and 46, respectively, that have mating relation within the cylindrical wall 26 of the valve chamber. The seat carrier elements also define generally planar gate support surfaces 48 and 50 that are located in generally parallel relation for supporting engagement with opposed sealing surfaces 52 and 54 of a gate member 56. The gate member is formed to define a port that is shown in broken lines at 58 which is positioned in registry with the inlet and outlet flow passages 16 and 18 and respective openings 60 and 62 defined by the seat rings to allow flow of fluid in the open position of the valve mechanism. Although the gate element 56 of the valve mechanism is shown as a slab type gate, it is not intended that the present invention be limited to the use of slab gates. It is within the scope of the present invention to utilize expanding gates and other gate mechanisms without departing from the spirit and scope of the present invention.

Figure 6:
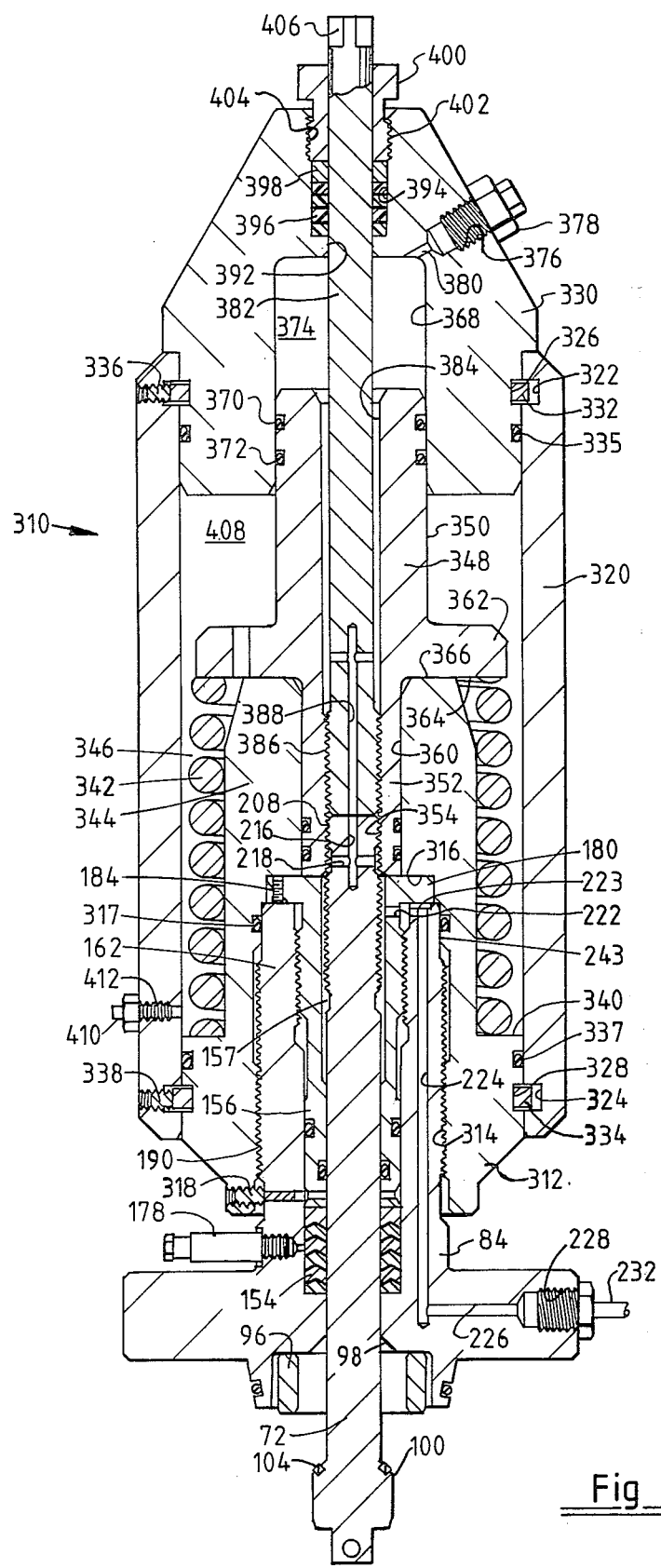
FIG. 6 is a view illustrating a valve such as shown in FIGS. 1 and 5 being provided with a hydraulic actuator system with a spring return type fail-safe actuator system, with parts of the valve and actuator assembly shown in full line with parts thereof broken away and illustrated in section.
Figure 7:
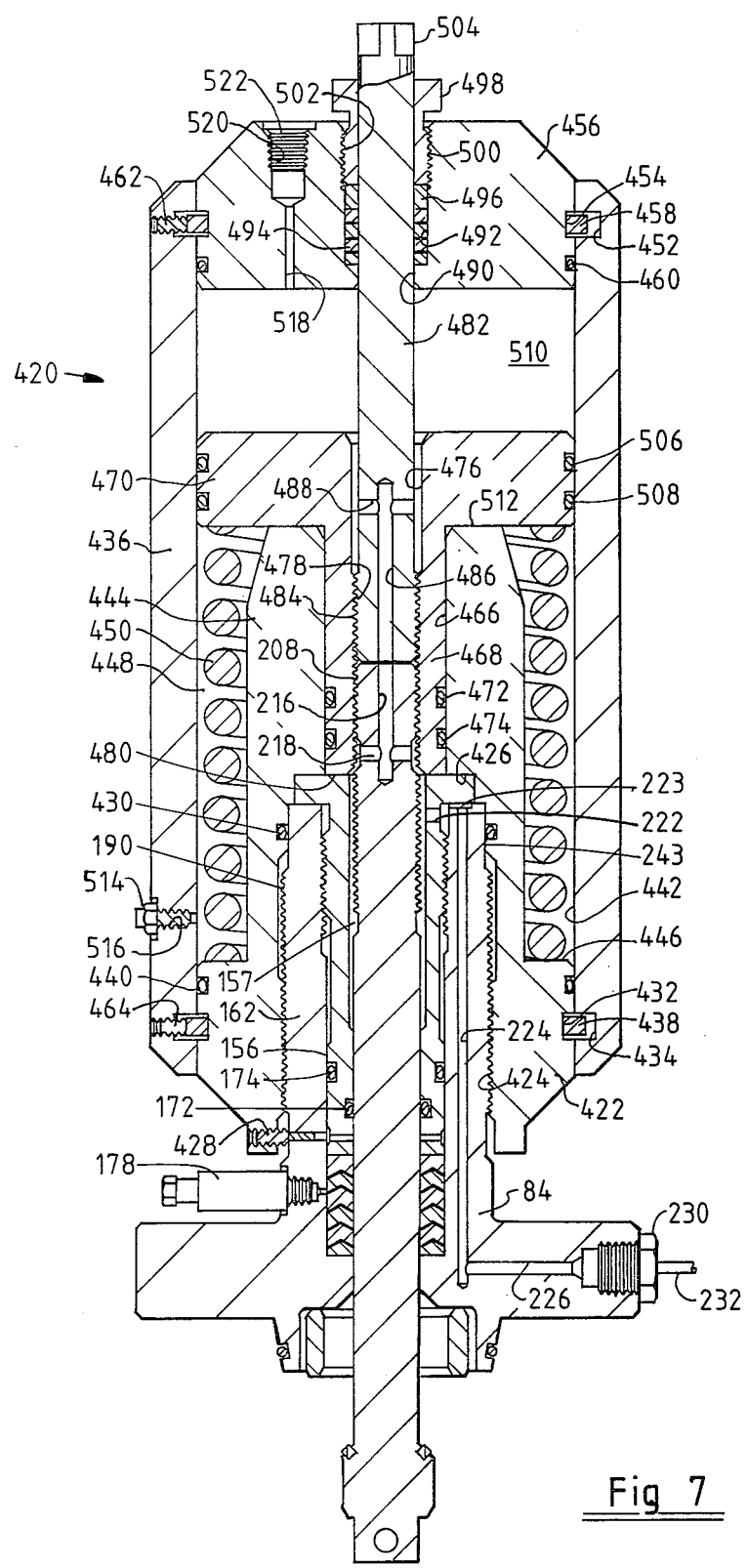
FIG. 7 is a view of a valve mechanism similar to that illustrated in FIGS. 1, 5 and 6 with the valve mechanism being provided with a pneumatic actuator system having a fail-safe type spring return actuator system, said view illustrating the valve and actuator assembly partly in full line with parts thereof broken away and shown in section.

It may be desirable to utilize an automatic system for moving the gate element to a preselected safe position in the event a predetermined condition, such as power failure, occurs. In some cases, it may be desirable for the gate to be shifted to a preselected closed position while in other cases it may be desirable for the gate member to be shifted to an open position. In order to facilitate selective automatic shifting of the gate mechanism to the open or closed positions, it is desirable that the gate member be reversible to achieve fail-safe opened or fail-safe closed positioning as desired. Accordingly, the gate member 56 is formed to define generally identical stem connection recesses 64 and 66, respectively, that are adapted to receive connection extensions 68 and 70 of a valve stem 72 or a pressure balancing stem 74, as the case may be. The stem/gate connection structure may differ by being internally threaded with right hand threads at one end and left hand threads at the opposite end. In this case reverse gate positioning may be achieved by simply substituting a gate having a port positioned at the opposite extremity thereof. In many fail-safe valve mechanisms, the gate element is shifted upwardly either by a compression spring or some other suitable mechanical apparatus to position the gate at a preselected safe position. As shown in FIG. 1, the gate 56, if shifted upwardly, would be moved to the closed position. In the event it is desirable to shift the gate mechanism to a predetermined open position, the gate member may simply be reversed on assembly, placing the port 58 at the lower portion of the gate. The port 58 will therefore be positioned in registry with flow passages 16 and 18 upon being automatically shifted upwardly. FIGS. 6 and 7 are representative of mechanisms that are capable of shifting the gate member upwardly in the event a hydraulic or pneumatic system should fail or in the event hydraulic or pneumatic pressure is automatically vented responsive to some other kind of safety system. Connection between the gate and the stems is accomplished by means of connection pins 76 and 78 that extend through registering apertures formed in the gate and the connection portions of the respective stems. It should be borne in mind that it is necessary only that a non-rotatable relationship be established between the gate member and the valve stem. The stem and gate connection structure illustrated in the drawings therefore is merely representative of one suitable embodiment of the present invention.

The upper portion of the valve chamber 14 may be defined by an annular tapered surface 80 within which may be received an externally tapered sealing portion 82 of a bonnet structure 84 forming a closure for the valve body. An annular bonnet sealing element 86 is retained within an annular groove formed in the flexible sealing portion of the bonnet and engages the tapered sealing surface 82 of the valve body to establish sealing engagement therewith on assembly of the bonnet structure to the valve body. The bonnet is also formed to define a bonnet flange 88 having a plurality of apertures 90 formed therein through which threaded studs 92 may extend for retention of the bonnet in assembly with the valve body by means of a plurality of nuts 94. The taper of the sealing portion 82 of the bonnet and the sealing surface 80 of the valve body may be slightly different, thereby causing the tapered sealing portion 82 of the bonnet to become flexed by a camming action between the tapered surfaces as the bonnet flange is forced into tight engagement with the upper portion of the valve body when the nuts 94 are tightened. Mechanical flexing of the sealing portion 82 of the bonnet structure develops a metal-to-metal seal that is enhanced by the sealing ability of the bonnet seal 86. A bonnet spacer ring 96 may be positioned within the upper extremity of the valve chamber to establish proper positioning of the seat carrier elements 40 and 42 and maintain spacing between the seat carrier elements and the flexible sealing portion 82 of the bonnet structure. It is necessary that the bonnet sealing element 82 be free from contact with any other mechanical structure in order that proper sealing activity may take place without interference.

It is desirable to provide a back-face sealing arrangement to allow the establishment of sealing engagement between the valve stem and the bonnet structure 84. It is also desirable to provide means for positioning the valve stem and the gate member at the closed position of the valve mechanism. In accordance with the present invention such is accomplished by forming the bonnet structure to define an internal back-face seat surface 98 which is of frusto-conical configuration and which is adapted to be contacted by a frusto-conical sealing surface 100 that is defined by an enlarged portion 102 of the valve stem 72. An annular groove is formed in the enlarged portion of the valve stem at the sealing surface 100 and retains an annular sealing element 104 that also contacts the frusto-conical seating surface 98 when the gate member 56 has been moved to its uppermost position. The annular sealing element 104 extends slightly beyond the sealing surface 100.

The pressure balancing stem 74 may also be provided with an enlarged portion 106 defining a generally frusto-conical sealing surface 108 that is adapted to establish sealing contact with an annular seating portion 110 defined within the valve body at the lower portion of the valve chamber 14. An annular sealing element 112 may be retained within an appropriate groove formed in the enlarged portion 106 of the pressure balancing stem at the sealing surface thereof for the purpose of assisting in the establishment of a positive back-face seal when the gate element 56 is at the lowermost or open position thereof as shown in FIG. 1. With the tapered sealing surface 108 of the pressure balancing stem 74 in contact with the frusto-conical seating surface 110, the port 58 of the gate will be positively aligned with respect to the flow passages 16 and 18. In addition to providing back-face sealing therefor, the surfaces 100 and 108 of the valve stem and pressure balancing stem, respectively, define stop means that properly position the gate element at each extremity of its travel between open and closed positions.

The valve body structure 12 is formed at the lower portion thereof to define a pressure balancing stem passage 114 that is enlarged at 116 to define a packing chamber within which is received a packing assembly for the purpose of maintaining a fluid tight seal between the valve body structure and the pressure balancing stem 74. The packing assembly is maintained within the packing chamber by means of a packing gland or retainer 120 that is threadedly received within an internally threaded portion 122 of the valve stem passage. The packing gland 120 is also formed internally to define a stem passage 124 through which the outer extremity of the pressure balancing stem 74 extends. The outer extremity of the packing gland is formed to define an internally threaded hydraulic connection 126 that is in communication with the stem passage 124 by means of a small diameter passage 128. The purpose of the hydraulic connection 126 will be discussed in detail hereinbelow.

An annular sealing element 130, such as an O-ring or the like, is received within an annular groove formed in a tapered sealing portion 132 of the packing gland 120 and is positioned in sealing engagement with an internally tapered surface 134 defined within the valve body structure, thereby extablishing a positive seal between the packing gland and the valve body. A seal is also established between the pressure balancing stem 74 and the packing gland by means of an annular sealing element 136 that is retained within an annular groove defined within the packing gland.

In the event the packing assembly should become worn to the point that a leak may be established at the pressure balancing stem 74, suitable sealant material, such as plastic sealant, may be injected into the packing assembly through a passage 138 by means of a packing injection fitting 140 that is threadedly received by the valve body. For the purpose of detecting any leakage at the pressure balancing stem, a passage 142 formed in the valve body is stopped by means of a plug 144 such as might be formed of any suitable rubber-like material. In the event a leak develops at the pressure balancing stem packing, the O-ring sealing elements 130 and 136 will prevent the leaked material from flowing through the packing gland. Rather, the leaked fluid will exit the valve body structure through passage 142 by first having displaced the plug element 144 from the passage. The passage and plug 144 is therefore a tell-tale leak detector that allows operating personnel to quickly determine that packing leakage has developed and repressurization of the packing assembly is therefore in order.

The valve chamber 14 may be vented by means of a body vent fitting 146 that may be simply threaded into the valve body in communication with a vent passage 148.

The bonnet 84 is formed to define a valve stem passage having a reduced diameter portion 150 through which the valve stem 72 is extended in close fitting relation. The valve stem passage includes an enlarged portion 152 defining a packing chamber within which is received a packing assembly 154 for the establishment of a sealed relation between the valve stem and bonnet. A packing gland 156 is received within the valve stem passage and is secured by an externally threaded portion 158 thereof that is received by internal threads 160 defined within an upper extension portion 162 of the bonnet 84. The lower extremity of the packing gland 156 defines an annuler shoulder for retaining the packing assembly 154 within the packing chamber. In the event the packing assembly 154 should become worn to the point that leakage occurs, it is desirable to prevent possible contamination of the valve actuator assembly by the leaked fluid medium and it is also desirable to provide a tell-tale indication of such leakage. For this reason the packing gland is formed at its lower extremity to define a plurality of openings 164 in communication with a leakage collection annulus 166 defined by an external groove formed in the lower extremity of the packing gland. The annular 166 is in fluid communication with a transverse passage 168 formed in the extension portion of the bonnet and this passage may be plugged by means of an elastomeric plug 170 that is frictionally retained within the passage 168. The plug 170, like plug 144, defines a protective closure for the passage 168 and prevents dust and other particulate contaminants from entering the packing assembly and possibly contaminating the packing or the valve actuator. In the event packing leakage occurs, the leaked fluid will be prevented from flowing through the valve stem passage by means of O-rings or other suitable sealing elements 172 and 174 that are retained within annular grooves formed in the packing glands 156. In the event the packing assembly 154 should develop a leak, the packing assembly may be restored to appropriate sealing condition by injection of sealant material through a sealant injection passage 176 by means of a sealant injection fitting 178 that is threadedly retained by the bonnet structure 84. Any suitable sealant material such as semi-solid plastic sealant material, for example, may be utilized within the scope of the present invention for enhancing the sealing ability of the packing assembly 154. The upper extremity of the packing gland is formed to define an annular flange 180 that is seated against the upper extremity 182 of the extension portion 162 of the bonnet structure. To insure against inadvertent unthreading of the packing gland from the bonnet structure, a set screw or any other suitable locking element may be provided to establish a locking relation between the packing gland and the bonnet.

An elongated gland cap and bearing retainer element 186 is provided having a lower internally threaded portion 188 having threaded engagement with external threads 190 formed on the upper extension portion 162 of the bonnet. It will be observed that the external threads 190 are of considerable length and will facilitate substantial linear movement of the cap 186 relative to the extension portion of the bonnet while maintaining threaded connection therewith. The purpose of this linear movement is to enable a back seated relationship to be developed between the valve stem and the bonnet regardless of the initial position of the valve stem at the time the back face seating movement is initiated. The length of the threads 190 allows the cap 186 to be moved axially a distance at least as great as normal gate movement between the open and closed positions thereof. In the event the manual valve actuator illustrated in FIG. 1 should become disabled for any reason, it is possible to accomplish movement of the valve stem and gate from the open position illustrated in FIG. 1 to the closed position. To accomplish such movement, the cap 186 is unthreaded sufficiently to allow linear travel of the stem and gate to a desired position.

The bearing and gland cap 186 is formed internally to define an annular shoulder 192 that engages the upper surface of the flange portion 180 of the packing gland to limit downward or inward movement of the cap as it is threaded onto the upper extension portion 162 of the bonnet. The cap is also formed internally to define a circular bearing receptacle 194 within which is located a pair of thrust bearings 196 and 198 that are positioned on either side of an annular flange portion 200 of a rotatable drive element 202. The drive element or drive nut is formed to define an internal stem receptacle 204 and is also formed to define an internally threaded portion 206 that receives external threads 208 defined at the upper extremity of the valve stem 72. The drive element 202 is rotatable by means of a hand wheel 210 or any other suitable rotatable mechanism that is secured to the upper extremity of the drive element by means of a connecting pin 212 that is extendable through a transverse opening 214 formed in the upper extremity of the drive element. As the drive element is rotated, thrust loads applied thereto by its threaded engagement with the valve stem will be transmitted through the bearings 196 and 198 to the bearing cap 186 and the flange portion 180 of the packing gland, respectively. As the drive element 202 is rotated, the valve stem will be caused by its threaded engagement with the drive element to be moved upwardly or downwardly, thus imparting movement to the gate member toward the open or closed positions thereof.

As the valve stem member is moved inwardly or outwardly with respect to the valve body and bonnet structures, it will be desirable to provide for fluid displacement by virtue of volumetric changes that occur due to the relationship between the valve stem, the drive element and other portions of the valve mechanism. Likewise, at the lower portion of the valve body the pressure balancing stem 74 will be caused to move inwardly or outwardly relative to the valve body structure as the gate 56 is moved and therefore fluid displacement will occur within the stem passage 124 of the lower packing gland 120. In accordance with the present invention, it is desirable to provide for displacement of fluid at the extremities of the valve stem and pressure balancing stem without venting any of the displaced fluid into the atmosphere. In accordance with the present invention, a fluid interchange system is provided that allows fluid displaced from either the valve stem or pressure balancing stem area of the valve construction to be directed toward the opposite one of the valve stem or pressure balancing stem. By providing a closed fluid interchange system, fluid displacement can occur without any possibility of developing a hydraulic lock that might retard or prevent efficient operation of the valve mechanism. The upper extremity of the valve stem is formed to define a blind axial bore 216 that is intersected by a transverse bore 218 that extends through the valve stem. The transverse bore communicates with an annular reduced diameter portion 220 of the valve stem and therefore fluid displaced from the stem receptacle 204 as the valve stem moves upwardly will flow through passages 216 and 218 into the annulus defined by the reduced diameter portion 220 of the valve stem. The upper portion of the packing gland 156 is formed to define an aperture 222 through which displaced fluid may flow into a passage 224 that is formed in the bonnet structure. Passage 224 is intersected by a transverse passage 226 that opens into an internally threaded connection opening 228. A connector 230 such as any suitable hydraulic connector may be received within the internally threaded opening 228 and may establish connection between the transverse passage 226 and a fluid interchange conduit 232. The fluid interchange conduit extends to the pressure balancing portion of the valve body and is connected to the lower packing gland 120 by means of a suitable connector 234 such as a hydraulic connection that is threadedly received within the internally threaded opening 126 of the lower packing gland. The conduit 232 is shown schematically in part and is illustrated as an externaly conduit. It should be borne in mind that the fluid interchange passage may be formed internally of the valve structure as well as by an external conduit, depending upon the particular characteristics of the valve involved. A tee connection 236 is interconnected into the fluid interchange conduit 232 and a fluid supply conduit 238 may interconnect the tee connection with a source "S" of pressurized fluid which is controlled by means of a control valve "V". A plug may be substituted in place of the conduit 238 when external pressure is required. O-rings 240 and 242 or other suitable sealing elements contained within the bearing cap 186 establish seals with the rotatable drive element 202 and the upper portion of the bonnet structure, respectively. These seals isolate the displace fluid medium and prevent it from flowing along the inside of the valve cap. Sealing elements 240 and 242 confine the displaced fluid medium to the passages 222, 224 and 226 and also to the closed fluid interchange conduit 232.

Considering that the valve stem and pressure balancing stem displace fluid within chambers at each extremity of the valve body, fluid interchange will occur as follows. With the valve construction in the position illustrated in FIG. 1, with the port 58 of the gate in the open position, aligned with the flow passages 16 and 18, the valve mechanism will be closed upon upward movement of the valve stem and gate. The drive element 202 is rotated causing it threaded relation with the valve stem 72 to move the valve stem upwardly, thus also moving the gate member upwardly. This causes the upper extremity of the valve stem to be moved into the stem receptacle 204 and thus fluid within the receptacle must be displaced. Simultaneously, the pressure balancing stem 74 will move upwardly thus tending to create a vacuum or void within the stem passage 124. Fluid displaced from the stem receptacle 204 will flow through stem passages 216 and 218 to the annulus 220. The fluid is then displaced downwardly through the stem passage into the transverse port 222 where it flows into the passages 224 and 226 and then into the fluid interchange conduit 232. As the pressure balancing stem moves upwardly, the displaced fluid medium flowing through the fluid interchange conduit 232 will enter the stem passage 124 after flowing through the connecting passage 128 of the lower packing gland. Because the valve stem and the pressure balancing stem are of the same diameter, the fluid that is displaced from the stem receptacle and stem passage will be fully received within the opposite receptacle or passage. Thus, there is provided a fluid interchange that allows pressure balanced valve operation to occur and yet protects against contamination of either the valve stem or the pressure balancing stem by the environment within which the valve mechanism is located.

Figure 3:
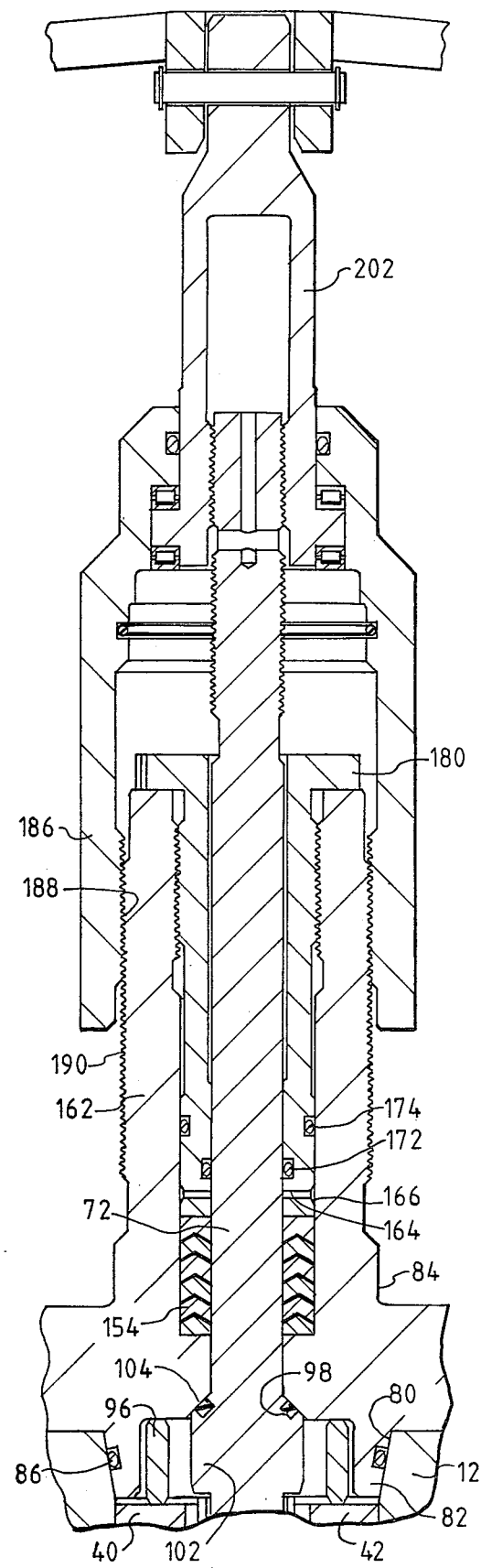
FIG. 3 is a sectional view similar to the sectional view of FIG. 2 and illustrating the bearing retainer cap being moved to an inoperative position to allow linear movement of the gate and valve stems from the open position to a back seated position.
Figure 4:
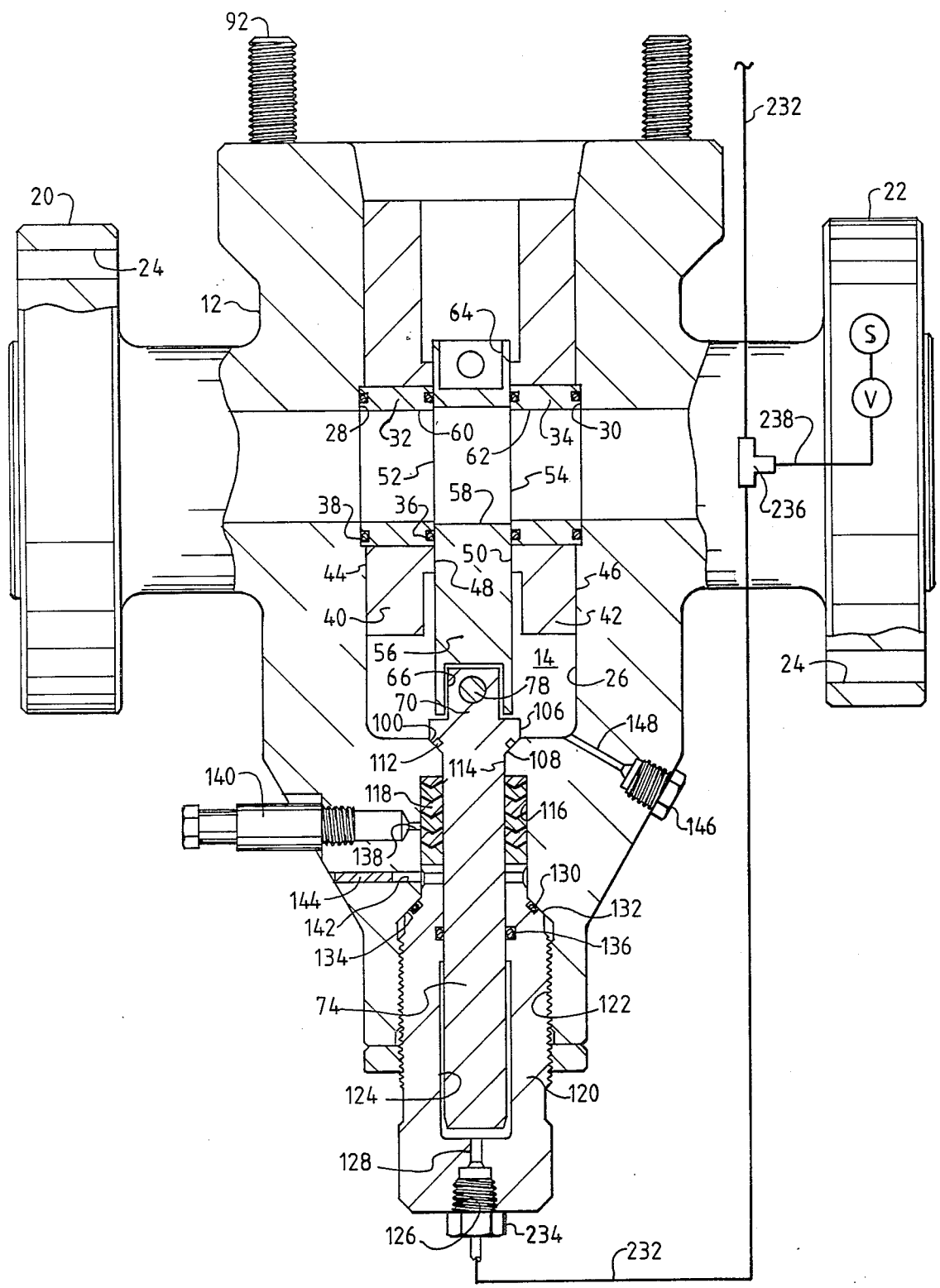
FIG. 4 is a partial sectional view of the valve mechanism of FIG. 1 illustrating the pressure balancing system of the invention in detail.

As mentioned above, the present invention provides for establishment of a back-face seal between the valve stem and bonnet regardless of the initial position of the gate and valve stem prior to operations to achieve the back-face seal. For this reason, the bearing and gland cap 186 may be unthreaded from the bonnet, after first loosening the locking set screw 244. If the gate is in the open position as shown in FIG. 1, the bearing cap 186 must be unthreaded sufficiently to allow outward movement of the drive element 202 to the extent necessary to bring the back-face sealing surfaces 98 and 100 into sealing engagement. As the bearing cap 186 is backed off, the drive element and bearings will remain stationary as shown in FIG. 3 although in some cases the outward bearing 196 will travel with the bearing cap during such movement. After the bearing cap has been shifted linearly in this manner, the fluid interchange conduit 232 will be disconnected from the lower packing gland 120 and a portable hydraulic pump will be connected in its place. Pressure applied by the portable hydraulic pump will act upon the cross-sectional area defined by the pressure balancing stem, thereby developing a resultant force that will shift the pressure balancing stem, gate and valve stem upwardly, thus bringing the sealing surface 100 and the resilient self 104 into sealing engagement with the back-face seat surface 98. With the back-face seal maintained by hydraulic pressure in this manner, and with the valve in its closed position, the bearing cap may be completely unthreaded from the bonnet structure and the drive element 202 may be unthreaded from the valve stem. The packing gland 156 then may be removed, thus exposing the packing assembly for replacement or repair. It is seen, therefore, that replacement of the packing gland may occur with the valve under pressure. Field repair of this character can be carried out in a few minutes' time, thus limiting down time of the flow line controlled by the valve.

It may be desirable to provide a valve and actuator assembly that is adapted for hydraulic operation rather than for manual operation as indicated in FIG. 1. It may also be desirable to substitute a hydraulic actuation system for a manually operated valve mechanism and to do so without necessitating removal of the valve mechanism from the flow line. Further, it is desirable to provide for change-over from a manually operated valve mechanism to a hydraulically energized valve actuating system without interrupting the normal service of the flow line controlled by the valve. In accordance with the present invention, these features are within the capability of the valve mechanism as is evident from a review of the valve and actuator assembly of FIG. 5. It should be borne in mind that the valve assembly of FIG. 5 including the bonnet structure, valve stem and packing gland assembly will be identical as compared to the valve construction of FIG. 1. Like parts of these figures are provided with like reference numerals for purposes of identification.

As mentioned above in connection with FIG. 1, it is possible to remove the bearing cap structure 186 after first having loosened its set screw 244 simply by unthreading the bearing cap from the externally threaded portion 190 of the upper extension portion 162. Typically, this will be done after the valve stem 72 have been shifted to its back-face sealed position with the tapered surfaces 98 and 100 in sealing engagement. Because the valve mechanism is pressure balanced, however, the valve stem and gate may remain in the open positions thereof as illustrated in FIG. 1 thus continuing productive flow through the valve while the bearing cap is being unthreaded. Of course, the hand wheel 210 should be removed from the upper extremity of the drive element 202 prior to unthreading of the bearing cap. With the back-face seal established between the pressure balancing stem and the valve body it will be evident that the internal pressure of the valve chamber will act upon a greater cross-sectional area of the pressure balancing stem than the valve stem because of the seal that is developed between the back-face seat 110, the metal sealing surface 108 and the resilient sealing element 112. A resultant force will be developed acting upon the pressure balancing stem that will tend to retain the pressure balancing stem and the gate member 56 at the open position thereof. The frictional forces between the gate and the seat members 32 and 34 will also assist in retaining the gate member in the open position during removal of the bearing cap 186. As the bearing cap is removed, the drive element 202 and the thrust bearings 196 and 198 will be retained in assembly with the valve stem by virtue of the threaded connection between the drive element and the valve stem. The drive element 202 then may be removed from the valve stem simply by unthreading and the thrust bearings 196 and 198 will be removed along with the drive element. The packing gland 156 will remain in threaded and locked engagement within the upper portion of the bonnet structure during the changeover procedure from the manual actuator of FIG. 1 to the hydraulic actuator of FIG. 5.

Assuming that the bearing cap and drive element of FIG. 1 have been removed in the manner discussed above and it is desirable to provide the valve mechanism with a hydraulically energized actuator system, a hydraulic actuator generally illustrated at 250 may be interconnected with the valve mechanism in the manner described as follows. A piston element 252 that is formed to define an internally threaded blind bore 254 will be threaded onto the externally threaded upper extremity 208 of the valve stem 72. The depth of the internally threaded blind bore 254 will be sufficient to position a lower stop surface 256 of the piston for contact with the upper surface of the packing gland when the port 58 of the gate is positioned in registry with the flow passages 16 and 18 of the valve body. The piston 252 is then locked with respect to the valve stem by a set screw 258 or any other suitable locking device that is received within the reduced diameter portion 220 of the valve stem. The lower externally threaded extremity of a position indicator rod 260 is then threadedly positioned within an internally threaded bore 262 formed in the piston and a locked relationship is developed between the positioned indicator rod and the piston by means of a set screw 264 that is receivable within an annular groove 266 defined at the lower extremity of the position indicator rod.

A hydraulic cylinder cap 268 having an internally threaded portion 270 is then threaded onto the externally threaded extension portion of the bonnet sufficiently to bring an annular stop surface 272 into engagement with the upper extremity of the packing gland simultaneously with seating of an internal annular stop surface 274 against the upper extremity of the bonnet. When so positioned, the hydraulic cylinder cap 268 will be locked with respect to the bonnet structure by means of a set screw 276 or other suitable locking device that prevents inadvertent rotation of the cylinder cap relative to the bonnet structure. When the hydraulic cylinder cap is properly seated an O-ring 278 or other suitable sealing element retained within the cylinder cap will be brought into sealing engagement with cylindrical surface 243 defined at the upper extremity of the bonnet. The seal developed by the sealing element 278 precludes any leakage of hydraulic fluid between the hydraulic cylinder cap and the extension portion of the bonnet.

Within the upper portion of the hydraulic cylinder cap is defined an internaly cylindrical surface 280 that is engaged by annular sealing elements 282 and 284 such as O-rings or other suitable sealing elements that are retained within annular grooves defined in the outer cylindrical portion 286 of the piston 252. The piston and sealing elements cooperate with the cylindrical internaly wall 280 to define an internal hydraulic chamber 288 within which the piston 252 reciprocates. The upper extremity of the hydraulic cylinder cap 268 is formed to define a position indicator bore 290 through which the position indicator rod 260 extends so as to expose the upper extremity 292 of the position indicator rod for visual inspection. As the piston reciprocates within the internal hydraulic chamber 288, reciprocation is also imparted to the valve stem 72 and to the gate member that is interconnected with the valve stem. The position indicator rod therefore may be visually inspected to determine the position of the gate and also to provide an indication that operational movement is occurring as the hydraulic actuator is energized. Internal sealing elements 294 and 296 such as O-rings are retained within annular grooves formed within the position indicator bore and function to establish a fluid tight seal between the outer cylindrical surface of the position indicator rod and the hydraulic cylinder cap, thus preventing leakage of hydraulic fluid along the position indicator rod during operational movement.

The upper extremity of the hydraulic cylinder cap 168 is formed to define an internally threaded connection opening 298 that communicates with a hydraulic fluid passage 300 through which hydraulic fluid is introduced into the internal hydraulic chamber 288. A connection fitting 302 of any suitable type may be received within the internally threaded opening 298 so as to secure a hydraulic supply conduit 304 to the upper portion of the hydraulic cylinder cap. The hydrualic supply conduit will be connected to a source "S" of pressurized hydraulic fluid that is controlled by means of a control valve system "V". Introduction of pressurized hydraulic fluid into the supply conduit 304 will result in pressurization of the hydraulic chamber 288 thus causing pressure to act upon the cross-sectional area of the piston, developing a resultant force that urges the piston member downwardly or inwardly and thus shifting the valve stem, gate member and pressure balancing stem to the open positions thereof aligning the port 58 of the gate with the flow passages of the valve.

Figure 5:
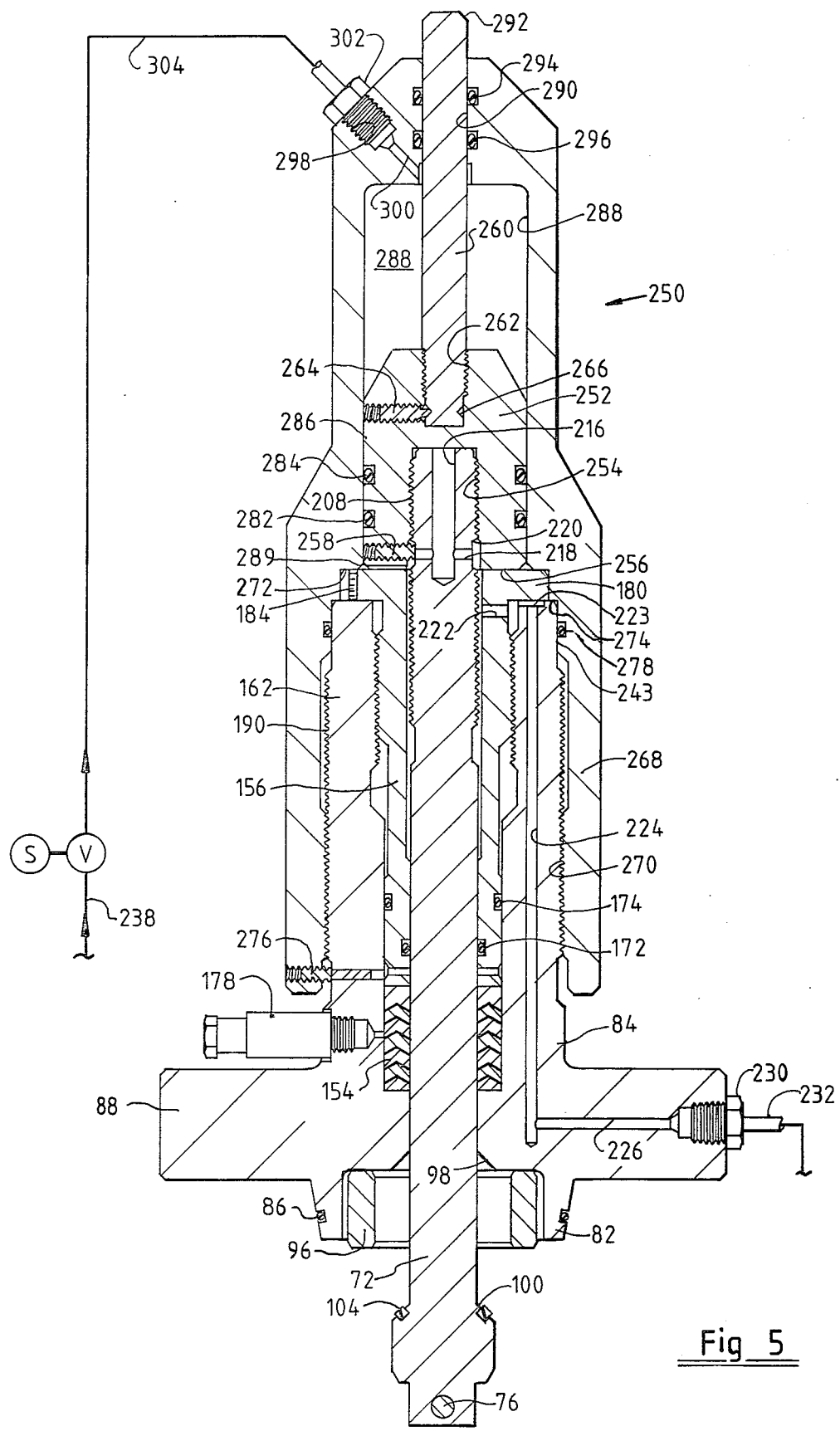
FIG. 5 is an elevational view of a valve mechanism such as that shown in FIG. 1 being provided with a hydraulic actuator system and having parts thereof shown in full lines with parts broken away and shown in section.

As shown schematically in FIG. 5, the tee connection 236, discussed above in connection with FIG. 1, may be supported by the valve body structure so as to provide structural rigidity for the hydraulic fluid supply and closed fluid interchange system that is illustrated schematically in FIG. 1 and in FIG. 5. Where hydraulic energization is utilized as shown in FIG. 5, the branch conduit 238 connected to the tee fitting 236 will be in communication with the control valve system as schematically illustrated. As fluid pressure is introduced into the fluid supply conduit 304 to urge the piston element downwardly or inwardly, hydraulic fluid will be displaced from that portion of the linear hydraulic motor that is located within the hydraulic cylinder cap, inwardly of the piston member. The displaced hydraulic fluid from the inner hydrualic chamber 289 will flow inwardly through the stem passage defined by the packing gland to the port 222 and thus through the slot 223 in the upper extremity of the bonnet to the passages 224 and 226. The hydraulic fluid will exit the bonnet structure at the connector 230 and will enter the fluid interchange conduit 232 that conducts the displaced hydraulic fluid to the tee fitting 36 and thus into the branch conduit 238. The displaced hydraulic fluid will be returned to the control valve assembly "V" for controlled entry to the source "S" of hydraulic fluid. It will be seen, therefore, that the linear hydraulic motor that is developed by the hydraulic actuator 250 is a double acting hydraulic motor that also achieves upward or outer pressurized movement of the piston, valve stem and gate. Upon reversal of the hydraulic supply by appropriate positioning of the hydraulic control valve "V", the direction of flow illustrated by the flow arrows will reverse and pressurized hydraulic fluid will be introduced from the pressurized source "S" through branch conduit 238 and through the tee fitting 236 and conduit 232 into passages 226 and 224 of the bonnet structure. The pressurized hydraulic fluid will enter the inner hydraulic chamber 289 through the passage structure defined by the slot 223 in the upper extremity of the bonnet, the port 222 and the packing gland passage through which the valve stem extends. The piston member 252 will be caused to move outwardly, thus displacing hydraulic fluid from the outer hydraulic chamber 288 through the passage 300 and conduit 304 back through the control valve assembly to the flow supply source "S".

It will be observed that a substantially pressure balanced condition is maintained at all times to promote ease of valve movement and fluid interchange between the pressure balancing stem and valve stem is also maintained by means of the closed fluid interchange system described above in connection with FIG. 1. The conduit 232 that is also connected to the tee fitting 236 and through connector element 234 to the pressure balancing stem passage 124. As pressurized hydraulic fluid is introduced, either through conduit 304 or conduit 238, to achieve operational movement of the piston, valve stem and gate, the pressure of the hydraulic fluid will also be introduced into the pressure balancing stem passage 124 through conduit 232. Thus, hydraulic pressure introduced into the inner hydraulic chamber 289 of the hydraulic actuator will also be transmitted by the closed fluid interchange system to the pressure balancing stem passage 124. The hydraulic pressure will thereby develop opposing pressure induced forces acting upon the valve stem and pressure balancing stem that will develop a force resultant of substantially zero. This resultant force will be unbalanced only when the back-face seal systems of the valve stem or bonnet are developed by positioning of the gate member at the maximum open or closed positions thereof.

Referring now to FIG. 3, it may be desirable to provide a hydraulic valve actuating mechanism to operate the valve and to provide an integral fail-safe system for the valve actuator that will return the valve actuator to a preselected safe position in the event the hydraulic pressure source for valve actuation should fail. It may also be desirable to provide a hydraulic valve actuator mechanism that may be connected to the valve structure in substitution for either a manual oeprator as shown in FIG. 1, a simple hydraulic operator as shown in FIG. 5 or a fail-safe type pneumatic actuator as shown in FIG. 7. It is also desirable to provide a hydraulic actuator mechanism that may be attached to a valve and bonnet assembly without necessitating any requirement for connection of hydraulic lines to the hydraulic actuator itself. These features will be readily accomplished by the valve actuator system set forth in FIG. 6.

Referring now to FIG. 6, the valve actuator mechanism illustrated generally at 310 is shown to include a body portion 312 that is formed to define an internally threaded portion 314 that is received by the externally threaded portion 190 of the upper extension portion 162 of the bonnet structure 84. An internal annular shoulder 316 defined within the body portion 312 is adapted to seat against the upper surface of the packing gland 156 when the body portion is fully engaged with the upper extension portion of the bonnet. A set screw 318, or other suitable locking element carried by the body portion, will be placed in locked engagement with the bonnet to prevent inadvertent separation of the valve actuator mechanism from the bonnet structure.

The actuator also includes an outer housing structure 320 having internal annular grooves 322 and 324 formed at the extremities thereof for registry with annular grooves 326 and 328 that are defined, respectively, in a cap portion 330 and the body portion 312 of the valve actuator construction. Locking rings 332 and 334 are received within respective ones of the registering grooves to establish an interlocking relationship between the housing portion 320 and the cap and body portions of the valve actuator assembly. Set screws 336 and 338, or other suitable locking elements, are received by the housing portion 320 and engage the lock rings 332 and 334, respectively, to maintain the lock rings in proper locking position relative to the registering grooves.

The body portion of the valve actuator construction is also formed to define an external annular shoulder 340 against which may be seated a fail-safe return spring 342. The annular housing 320 cooperates with an internal extending portion 344 of the body portion 312 to define an elongated annulus 346 within which the fail-safe return spring is contained.

A piston element 348 having a cylindrical external surface 350 is positioned within the housing 320 and includes a lower extension portion 352 that is formed to define an internally threaded portion 354 having threaded engagement with the upper externally threaded extremity 208 of the valve stem 72. Sealing elements, such as O-rings, 356 and 358 are retained within annular grooves defined at the lower extremity of the piston and serve to establish a sealed relationship with an internal cylindrical surface 360 defined by a bore extending through the extension portion 344 of the valve actuator body. The piston element also includes an annular intermediate flange portion 362 defining a lower annular stop surface 364 that is adapted to engage the upper extremity 366 of the valve actuator body to limit downward or inward movement of the piston at one end of its operative stroke. The lower surface 364 of the flange 362 also engages the upper extremity of the fail-safe return spring 342.

The upper cap portion 330 of the valve actuator assembly is formed to define an internaly cylindrical wall 368 that is engaged by sealing elements 370 and 372 that are disposed within annular grooves formed in the cylindrical piston 348. The piston cooperates with the internal cylindrical surface 368 to define an outer hydraulic chamber 374 within which hydraulic fluid is charged in the manner discussed hereinbelow in order to impart downward or inward movement of the piston 350 to cause downward movement of the valve stem 72 and gate against the compression of the fail-safe return spring 342. The cap portion 330 is also formed to define an internally threaded opening 376 that receives a vent fitting 378 that provides for manual venting of fluid from the chamber 374 through a vent passage 380. The vent fitting 378 may take any suitable form without departing from the spirit and scope of the present invention.

It is desirable to provide an indication of the position of the valve actuating mechanism in order to determine the operating position of the gate within the valve. It is also desirable to provide a visual indication that valve actuation is occurring when the valve actuator assembly is energized. These features are accomplished in accordance with the present invention by a position indicator rod 382 which extends through a bore 384 defined in the piston element 348. The lower extremity of the position indicator rod is formed to define an externally threaded portion 386 that is received by the internal threads 354 of the lower piston extension 352. The position indicator rod is threaded inwardly until its lower extremity engages the upper extremity of the valve stem 72. The position indicator rod 382 is formed to define an internaly blind bore 388 that registers with the blind bore 216 of the valve stem 72. A transverse passage 390 is also formed in the position indicator rod in intersecting relation with the bore 388 outwardly of the externally threaded portion of the position indicator rod. The function of registering bores 216 and 388 and the respective transverse passages 218 and 390 thereof is to permit flow of hydraulic fluid through these bores and passages as will be discussed in detail hereinbelow. The upper portion of the position indicator rod extends through a passage 392 that extends through the upper portion of the cap 330. A portion of the passage is enlarged to define a packing chamber 394 within which is received a packing assembly 396 to provide for the establishment of a fluid tight seal between the valve actuator cap 330 and the movable position indicator rod 382. The packing assembly includes an upper rigid ring-like portion 398 that is retained 398 that is retained by a packing gland element 400 having an externally threaded portion 402 that is received by an internally threaded portion 404 of the position indicator passage. The upper extremity of the position indicator rod 382 is formed to define a non-circular portion 406 that may be engaged by a wrench in order to facilitate threading the position indicator rod into the internally threaded portion 354 of the lower piston extension 352.

As pointed out above, the O-ring type sealing elements 335 and 337 establish seals between the cylindrical housing portion 320 of the valve actuator and valve actuator cap 330 at the upper extremity of the housing and with the body portion 312 of the valve actuator at the lower portion of the housing. The internal chamber within which the fail-safe compression spring 342 is located is therefore sealed with respect to the atmosphere by sealing elements 335 and 337. Internally of the valve actuator construction, lower sealing elements 356 and 358 maintain seals to prevent communication between the hydraulic chamber 374 and the fail-safe spring chamber 408. At the upper extremity of the piston 348 sealing elements 370 and 372 also function to maintain seals with the cylindrical wall 368 of the hydraulic chamber 374 to prevent fluid communication between the hydraulic chamber 374 and the fail-safe return spring chamber 408. Since the fail-safe spring chamber is not intended to be pressurized and since volumetric changes within the fail-safe spring chamber must be compensated for, a vent fitting 410 is received within a threaded passage 412 defined in the housing 320. The vent fitting 410 allows free interchange between the fail-safe spring chamber 408 and the atmosphere but prevents water, dust and other contaminants from entering the return spring chamber.

As mentioned above, the valve and bonnet structure illustrated in FIG. 6 will be essentially identical as compared to the valve and bonnet structure of FIGS. 1 and 5. With the position indicator rod unthreaded from the position shown in FIG. 6 and with the valve actuator unpressurized the fail-safe return spring 342 will maintain the annular flange portion 362 of the piston construction in engagement with the lower surface of the actuator cap 330. Assembly between the valve actuator and the bonnet structure will be accomplished simply by threading the body portion 312 of the valve actuator inwardly or downwardly onto the externally threaded portion 190 of the bonnet structure 84. As the lower extension portion 352 of the piston comes into engagement with the valve stem, bearing in mind that the valve stem and gate will be positioned at the closed position thereof, proper threaded engagement between the valve stem and the lower extension portion 352 of the piston will occur. The position indicator rod 382 then may be threaded into the internaly threads 354 of the lower piston extension 352. After the set screw 318 has been properly tightened, connection between the valve actuator and valve assembly will have been accomplished. Generally, however, the valve actuator mechanism will be assembled on the valve structure to insure that all threaded connections are properly established.

For purposes of operation, it should be borne in mind that the internal passages 224 and 226 of the bonnet structure as well as the transverse slot 223 and flow port opening 222 will be identical as compared to the construction illustrated in FIGS. 1 and 5. Thus, fluid from the passage 224 will flow through the slot 223 and port 222 into the stem passage of the packing gland and thence into the transverse passage 218 and axial passage 216 of the valve stem. By virtue of the registering passages, hydraulic fluid then may flow through passage 388 and transverse passage 390 into the stem passage bore 384 of the piston element 348. Thus, fluid from the passages 224 and 226 will be communicated into the hydraulic chamber 374.

For operation of the valve actuator in order to move the gate element of the valve mechanism to its open position pressurized hydraulic fluid from a pressurized hydraulic supply source "S" will be communicated through branch conduit 238 into the tee fitting 236 under control of the control valve mechanism "V". The pressure of the hydraulic fluid will be communicated via fluid interchange conduit 232 to the pressure balancing stem passage 124 as discussed above and to the valve stem passage 157. The pressure induced forces acting on the valve stem and pressure balancing stem will be equal and opposite to one another thereby developing a resultant force of zero as discussed above. The pressurized hydraulic fluid flowing from passage 224 through passages 216, 388 and 384 into the hydraulic chamber 374 will develop a pressure acting upon the piston that urges that piston member downwardly as shown in FIG. 6, thus, opposing the spring force of the fail-safe return spring 342. The spring 342 is thus compressed while the piston member 348 moves downwardly. As the piston member reaches the open position thereof the valve stem will have moved downwardly sufficiently to bring the port 58 of the gate member into registry with the flow passages 16 and 18 of the valve body. As the fully opened position is reached, the flange portion 362 of the piston element will contact the upper extremity 366 of the extension portion 344 of the valve actuator body 312. When this contact is made, further downward or inward movement of the piston element will be prevented and the open position of the valve mechanism will have been established.

The valve mechanism will be movable to the closed position thereof simply by controlling movement of the control valve mechanism "V" that allows hydraulic fluid within the fluid interchange conduit 232 to be bled through the tee fitting 236 and branch conduit 238 to an appropriate receiver such as a hydraulic fluids reservoir. When this condition occurs, the compressed fail-safe return spring 342 will urge the piston element 348 upwardly or outwardly and will displace hydraulic fluid from within the hydraulic chamber 374 causing the fluid to flow inwardly through annulus passage 384, passages 390, 388, 216 and 218 to the valve stem passage 157. The returning hydraulic fluid then flows through port 222 and slot 223 to the internal passages 224 and 226 of the bonnet structure.

It is apparent that the valve will remain in the open position thereof as long as hydraulic fluid is retained within the hydraulic chamber 374 so that the compression spring 342 will remain compressed as shown in FIG. 6. In the event damage should occur to the hydraulic fluid supply apparatus such as by failure of the hydraulic supply system or rupture of a hydraulic supply line, the valve mechanism will automatically be shifted to the safe or closed position thereof by the fail-safe return spring 342. In the event a hydraulic supply line ruptures, fluid within the hydraulic chamber 374 will be free to flow from the hydraulic chamber. The fail-safe return spring 342 will drive the piston member 348 outwardly or upwardly, thus moving the valve stem and gate member toward the closed positions thereof. When the upper portion of the flange 362 contacts the lower extremity of the cap portion 330 of the valve actuator the gate member will be fully closed and the valve will be rendered safe. In the event it is desired for the valve to be in the open position thereof responsive to automatic upward or outward movement of the valve stem the gate member may simply be reversed, placing the port 58 at the lower portion of the gate. Full outward movement of the valve stem will, thus, move the port member into registry with the flow passages of the valve.

Regardless of the pressure contained within the valve mechanism or the pressure within the fluid interchange conduit 232, a pressure balanced condition will be maintained except for those conditions where a back face seal is developed in the manner discussed above. In the event it should become desirable to bypass the hydraulic supply system in order to cause automatic movement of the gate member to the preselected safe position, the vent fitting 378 may be manually actuated so as to vent hydraulic fluid from within the hydraulic chamber 374 to the atmosphere. As the pressurized hydraulic fluid is released from the chamber 374 through the vent fitting, the fail-safe return spring 342 will move the piston element 348 upwardly or outwardly toward the safe position thereof. If desired, a pressure safety plug may be substituted for the vent fitting 378 to allow automatic emergency venting of the chamber 374, thus preventing over-pressurization of the hydraulic actuator.

Referring now to FIG. 7, there is illustrated a valve and bonnet assembly essentially identical with respect to the valve and bonnet assemblies of FIGS. 1, 5 and 6. The valve and bonnet assembly of FIG. 7 is provided with a pneumatic actuator illustrated generally at 420 having an actuator body portion 422 that is of essentially the same configuration as the actuator body structure 312 illustrated in FIG. 6. The actuator body is formed to define an internally threaded portion 424 that is adapted to receive the external threads 190 of the bonnet extension 162. The actuator body 422 is threaded onto the upper extension portion 162 of the bonnet sufficiently to bring an annular stop surface 426 into stop engagement with the upper surface of the packing gland 156. A set screw 428 or other suitable locking locking device carried by the actuator body 422 is brought into locking engagement with the bonnet structure to prevent inadvertent rotation of the actuator body relative to the bonnet. An annular internal seal element 430 retained within an appropriate groove formed within the actuator body is brought into sealing engagement with external cylindrical surface 243 as the actuator body is threaded to the properly seated position thereof. The actuator body is formed to define an annular groove 432 that is brought into registry with a groove 434 of a cylindrical housing structure 436 and an interlocked relation is established between the actuator body and housing by means of a locking ring 438. A sealing element 440 retained within a circular groove formed in the actuator body 422 establishes a seal with the internal cylindrical wall 422 of the cylindrical housing.

The actuator body structure 422 is formed to define a reduced diameter extension portion 444 and an annular spring support shoulder 446. The reduced diameter extension portion cooperates with the internal wall structure 442 of the cylindrical housing to define an annular spring chamber 448 within which is received a fail-safe return spring 450. The upper extremity of the cylindrical housing 436 is formed to define an internal annular groove 452 that is brought into registry with an external annular groove 454 defined in a closure cap 456. A locking ring 458 establishes a locked relationship between the cylindrical housing 436 and the closure cap 456 upon assembly. An annular sealing element 460, such as an O-ring or the like, is retained within an annular groove formed in the closure cap 456 and serves to establish a sealed relationship between the closure cap and the internal cylindrical surface 442 of the housing 436. Set screws 462 and 464 retained within the wall structure of the cylindrical housing 436 engage the annular locking rings 458 and 438, respectively, to insure that the locking rings are maintained in proper interlocking relationship with the cylindrical housing, the actuator body structure 422 and the closure cap structure 456.

The actuator body structure is formed to define an internal bore 466 within which may be retained an extension portion 468 of a piston element 470. Annular sealing elements 472 and 474 that are contained within annular grooves formed in the extension portion 468 function to maintain seals with the cylindrical wall defined by the bore 466 as the piston is moved within the cylindrical housing 436. The extension portion of the housing is formed to define an axial passage 476 having an internally threaded portion 478. The upper externally threaded extremity 208 of the valve stem 72 is received by the internaly threads 478 of the extension portion of the piston. The valve stem and piston are properly related when the lower extremity 480 of the piston engages the upper surface of the packing gland 156 with the valve stem and gate maintained at the open positions thereof.

A position indicator stem 482 extends into the axial passage 476 of the piston and is formed to define an externally threaded portion 484 that is threadedly engaged with the internal threads 478 of the piston extension 468. An internal blind bore 486 is formed axially within the position indicator stem 482 and is registered with the axial passage 216 of the valve stem. A transverse passage 488 is also formed in the position indicator stem in intersecting relation with the axial passage 486.

The closure cap 456 is formed to define a position indicator stem passage 490 through which the position indicator stem 482 extends. An enlarged portion 492 of the position indicator stem passage defines an annular packing chamber within which is received a packing assembly 494. A rigid packing retainer ring element 496 is received within the packing chamber and is retained therein by means of a packing gland 498 having an externally threaded portion 500 that is received by internal threads 504 defined at the outer portion of the position indicator stem passage. The position indicator stem defines a noncircular outer portion 504 that may be engaged by a wrench or other suitable implement for threading of the position indicator stem into the internally threaded portion 478 of the piston extension 468.

The piston 470 is formed to define a pair of annular external grooves within which are retained annular sealing elements 506 and 508 that establish sealing engagement with the internal cylindrical wall 442 of the actuator housing 436. The piston element divides the housing structure into a pneumatic chamber 510 and a spring chamber defined by the annulus 448. Pressurized gas will be supplied to the pneumatic chamber 510 from a supply source "S" under the control of a control valve "V" in branch conduit 238. The pressurized gas will be introduced through tee fitting 236 and fluid interchange conduit 232 into the passages 224 and 226 of the bonnet assembly. Thence, pneumatic pressure will be transferred through slot 223 and passage 222 into the stem passage 157 within the packing gland. The pressurized pneumatic will traverse passages 218, 216, 486 and 488 to provide for pressure flow into the pneumatic chamber 510. As shown in FIG. 7, the pneumatic actuator is energized, causing the piston element 470 to be moved downwardly to engagement with the upper surface of the extension portion 444 of the actuator body. The piston is limited against further downward or inward movement by the stop surface 512. When so positioned, the piston, bearing upon the upper portion of the failsafe return spring 450, will maintain the spring in a compressed condition. To close the valve mechanism, the control valve "V" will be positioned to bleed pneumatic fluid from the fluid supply passages thereby allowing pneumatic fluid within the chamber 510 to be vented. As pneumatic pressure within chamber 510 decreases, the fail-safe return spring 450 will begin to expand, driving the piston member outwardly or upwardly toward the closed position thereof. Outward movement of the piston member will cease when the back-face seal has been established between surfaces 98 and 100 of the bonnet and valve stem, respectively. Under this condition, the upper surface of the piston 470 may contact the lower surface of the closure cap 456. The valve is therefore closed by action of the fail-safe return spring and opened by pneumatic pressure introduced into the chamber 510.

A vent fitting 514 is threadedly received within an internally threaded opening 516 formed in the cylindrical housing 436. The vent fitting vents the spring chamber 448 to the atmosphere and yet prevents water, dust and other contaminants from entering the spring chamber. The closure cap 456 is formed to define a vent passage 518 having an outer internally threaded extremity 520 within which is received a safety plug 522. The safety pug is designed to rupture or blow-out in the event pneumatic pressure within the chamber 510 becomes excessive. This feature prevents the pneumatic chamber from becoming over-pressured to the point that the valve actuator might rupture or become damaged. In the event pressure should become abnormally high within the pneumatic chamber 510, the plug 522 will rupture thereby venting the chamber 510. When this occurs, the fail-safe return spring 450 will shift the piston member 470 to the closed position, thus also shifting the valve stem and gate to the closed positions thereof.

It will be evident from the foregoing that I have provided a unique pressure balanced gate valve construction incorporating selective actuator assemblies including a manual actuator, a hydraulic actuator and both pneumatic and hydraulic actuators provided with fail-safe return spring systems. Any of the valve actuator assemblies may be simply and efficiently interchanged as desired in order to achieve desired operational results. Interchange of the actuators may occur in the field and with minimum cost and down time from the standpoint of production. The valve and actuator mechanism also includes a fluid interchange system that allows the maintenance of a pressure balanced condition at all times and yet while maintaining the valve stem and pressure balancing stem portions of the valve mechanism closed to the atmosphere, thereby protecting the environment against inadvertent leakage of fluid controlled by the valve mechanism. The valve mechanism also includes facility for establishment of back-face seating both with respect to the valve stem and bonnet and with respect to the pressure balancing stem and valve body structure. Moreover, back-face sealing between the valve stem and bonnet may be accomplished regardless of the position of the gate and valve stem at initiation of the back-face seating movement. It is evident, therefore, that this invention is one well adapted to attain all of the objects and features hereinabove set forth together with other advantages and features which will become obvious and inherent from a description of the apparatus itself.

Having thus fully explained my invention, I claim:

1. A pressure balanced gate valve mechanism for controlling flow of fluid, said valve mechanism comprising:

a valve body defining a valve chamber and inlet and outlet flow passages intersecting said valve chamber, said valve body being formed to define seat recess means within said valve chamber about said inlet and outlet flow passages;

seat carrier means being positioned within said valve chamber and being formed to define seat retainer means, said seat carrier means defining gate guide means;

seat means being received by said seat retainer means of said seat carrier means and being at least partially received within said seat recess means;

bonnet means forming a closure for said valve chamber and containing first packing means, said bonnet means defining stop and back-face surface means;

gate means being movably positioned between said seat means and defining sealing surface means, said gate means defining port means for registry with said inlet and outlet passage means in the open position of said valve mechanism;

manual operator means for moving said gate and including actuator stem means being extended through said bonnet and being sealed with respect to said bonnet by said first packing means, stop and back-face seal means being defined by said actuator stem means and being engageable with said stop and back-face surface means at one of the open and closed positions of said gate means;

second packing means being supported by said valve body;

a pair of pressure balancing stem means being connected to said gate means and extending at least partially through said valve body, said second packing means sealing said pressure balancing stem means with respect to said valve body said pressure balancing stem means are received within a pair of balancing chambers, said chambers are in fluid communication through a fluid line which is connected to a remote pressure source, at least one pressure balancing chamber being positioned at least partially within said actuator housing and outwardly of said first packing means, said one pressure balancing chamber is also formed within said operator, whereby the volume of fluid displaced by said pressure balancing stem means is equal and a balanced condition is mainained in each chamber during movement of said gate means;

said valve body defining second stop and back-face seal surface means; and stop and back-face seal means being defined by said pressure balancing stem means and establishing sealing and gate positioning engagement with said second stop and back-face seal surface means in the other one of said open and closed positions of said gate means.

2. A pressure balanced gate valve as recited in claim 1, wherein:

said stop and back-face surface means are defined by internal conical surfaces;

said stop and back face shoulder means are defined by external conical surfaces adapted for mating engagement with said stop and back-face surface means, said shoulder means being formed to define an annular seal groove therein; and annular resilient seal rings are carried by said stop and back-face shoulder means within said seal groove and establish sealing engagement with said back seat surface means.

3. A pressure balanced gate valve as recited in claim 1, wherein:

said valve chamber is of generally cylindrical configuration;

said seat carrier means is defined by two seat carrier segments that are formed to define partially cylindrical surface means having mating engagement within said valve chamber, said seat carrier segments each defining a generally planar gate support surface, said seat carrier segments cooperating to define stem guide means; and said actuator stem defining an enlarged connecting portion that is receivable in guided relation by said stem guide means.

4. A pressure balanced gate valve as recited in claim 1, wherein said actuator stem includes:

connecting means establishing non-rotatable connection with said gate means and preventing rotation of said actuator stem during operation of said valve mechanism.

5. A pressure balanced gate valve as recited in claim 1, wherein:

said gate means is formed to define generally identical connection means at each extremity thereof;

said actuator stem means and said pressure balancing stem means being provided with generally identical connection means; and said gate means being reversible within said valve chamber for selective positioning of said port.

6. A pressure balanced gate valve as recited in claim 1, wherein said valve mechanism includes:

fluid energized operator means for imparting reciprocating movement to said actuator stem;

an auxiliary operator fluid connection means is provided on said valve body;

said fluid energized operator means is capable of being rendered inoperable; and with said manual operator means rendered inoperable, hydraulic pressure applied through said fluid connection means is capable of applying pressure induced force to said pressure balancing stem means, thus developing a resultant force causing said pressure balancing stem means to move said gate means to a selected position.

7. A pressure balanced gate valve as recited in claim 1, wherein:

packing retainer means is provided to retain said second packing within said valve, said packing retainer defining the other pressure balancing chamber, the other of said pressure balancing stem, means extending into said said other pressure balancing chamber seal means establishes a seal between said pressure balancing stem means and said packing retainer means;

said operator means is adapted to impart reciprocal movement to said actuator stem, said operator means is capable of being rendered inoperative; and with said operator means rendered inoperative, force applied to said pressure balancing stem means in a direction toward said gate means imparts movement of said pressure balancing stem means and said gate means to a selected position thereof.

8. A pressure balanced gate valve as recited in claim 7, wherein:

said actuator stem means is formed to define an externally threaded portion;

internally threaded drive means is engaged with said externally threaded portion of said actuator stem;

retainer means is provided on said valve mechanism and retains said drive means in assembly therewith, said retainer means being movable to an inoperative position, allowing linear movement of said actuator stem and said drive means upon hydraulic energized movement of said gate means.

9. A pressure balanced gate valve as recited in claim 1, wherein:
unbalancing means is provided within said valve and establishes a resultant force acting on said gate and actuator stem means in one of the open and closed positions of said valve and acting upon said gate and pressure balancing stem means in the other of said open and closed positions of said valve means.

10. A pressure balanced gate valve mechanism for controlling flow of fluid, said valve mechanism comprising:
a valve body defining a valve chamber and inlet and outlet flow passages intersecting said valve chamber, said valve body being formed to define seat recess means within said valve chamber about said inlet and outlet flow passages;
seat carrier means being positioned within said valve chamber and being formed to define seat retainer means, said seat carrier means defining gate guide means;
seat means being received by said seat retainer means of said seat carrier means and being at least partially received within said seat recess means;
bonnet means forming a closure for said valve chamber and containing first packing means, said bonnet means defining stop and back-face surface means;
gate means being movably positioned between said seat means and defining sealing surface means, said gate means defining port means for registry with said inlet and outlet passage means in the open position of said valve mechanism;
manual operator means for moving said gate and including actuator stem means being extended through said bonnet and being stop and back-face seal means being defined by said actuator stem means and being engageable with said stop and back-face surface means at one of the open and closed positions of said gate means;
second packing means being supported by said valve body;
pressure balancing stem means being connected to said gate means and extending at least partially through said valve body, said second packing means sealing said pressure balancing stem with respect to said valve body;
said actuator stem means is formed to define an externally threaded portion;
internally threaded drive means is engaged with said externally threaded portion of said actuator stem;
retainer means is provided on said valve mechanism and retains said drive means in assembly therewith, said retainer means being movable to an inoperative position, allowing linear movement of said actuator stem and said drive means upon hydraulic energized movement of said gate means; and
the threaded connection of said retainer means and said valve mechanism is of greater length than the length of normal gate travel during operation, and said retainer means is selectively positionable to allow sealing contact between said stop and back-face surface means of said bonnet and said stop and back-face seal means of said actuator stem at both the open and closed positions of said actuator means.

11. A pressure balanced gate valve as recited in claim 7, wherein:
said stem passage terminates in a hydraulic fitting through which hydraulic pressure is selectively applied to the vented extremity of said pressure balancing stem developing a force causing pressure induced movement of said pressure balancing stem and said gate means to said selected position.

12. A pressure balanced gate valve mechanism for controlling flow of fluid, said valve mechanism comprising:
a valve body defining a valve chamber and inlet and outlet flow passages intersecting said valve chamber, said valve body being formed to define seat recess means within said valve chamber about said inlet and outlet flow passages;
seat carrier means being positioned within said valve chamber and being formed to define seat retainer means, said seat carrier means defining gate guide means;
seat means being received by said seat retainer means of said seat carrier means and being at least partially received within said seat recess means;
bonnet means forming a closure for said valve chamber and containing first packing means, said bonnet means defining stop and back-face surface means;
gate means being movably positioned between said seat means and defining sealing surface means, said gate means defining port means for registry with said inlet and outlet passage means in the open position of said valve mechanism;
manual operator means for moving said gate and including actuator stem means being extended through said bonnet and being sealed with respect to said bonnet by said first packing means, stop and back-face seal means being defined by said actuator stem means and being engageable with said stop and back-face surface means at one of the open and closed positions of said gate means;
second packing means being supported by said valve body;
pressure balancing stem means being connected to said gate means and extending at least partially through said valve body, said second packing means sealing said pressure balancing stem with respect to said valve body;
a packing retainer is connected to said bonnet means and retains said first packing means within said bonnet, said packing retainer defining a passage through which said actuator stem extends;
said actuator stem defines a threaded extremity;
a stem drive element having threaded connection to said threaded extremity of said actuator stem; and
retainer means retaining said stem drive element and providing force reaction therefor to induce linear movement to said actuator stem responsive to rotary movement of said stem drive element, said retainer means being selectively positionable to allow simultaneous linear movement of said stem drive element and said actuator stem and allowing sealing contact between said stop and back-face surface means and stop and back-face seal means.

13. A pressure balanced gate valve as recited in claim 12, wherein:
said retainer means is threadedly connected to said bonnet, said threaded connection being of greater length than the length of gate travel during operation and allowing said sealing contact between said stop and back-face surface means and stop and back-face seal means to be developed both from the open and closed positions of said gate.

14. A pressure balanced gate valve mechanism for controlling flow of fluid, said valve mechanism comprising:

a valve body defining a valve chamber and inlet and outlet flow passages intersecting said valve chamber, said valve body being formed to define seat recess means within said valve chamber about said inlet and outlet flow passages;

seat carrier means being positioned within said valve chamber and being formed to define seat retainer means, said seat carrier means defining gate guide means;

seat means being received by said seat retainer means of said seat carrier means and being at least partially received within said seat recess means;

bonnet means forming a closure for said valve chamber and containing first packing means, said bonnet means defining stop and back-face surface means;

gate means being movably positioned between said seat means and defining sealing surface means, said gate means defining port means for registry with said inlet and outlet passage means in the open position of said valve mechanism;

manual operator means for moving said gate and including actuator stem means being extended through said bonnet and being sealed with respect to said bonnet by said first packing means, stop and back-face seal means being defined by said actuator stem means and being engageable with said stop and back-face surface means at one of the open and closed positions of said gate means;

second packing means being supported by said valve body;

pressure balancing stem means being connected to said gate means and extending at least partially through said valve body, said second packing means sealing said pressure balancing stem with respect to said valve body;

fluid interchange chambers enclosing the outer extremities of said actuator stem and said pressure balancing stem;

fluid interchange means is established between said fluid interchange chambers and establishes balanced pressure within each of said fluid interchange chambers;

a first one of said fluid interchange chambers surrounds the threaded extremity of said actuator stem;

the second one of said fluid interchange chambers surrounds the outer extremity of said pressure balancing stem; and fluid transfer means establishes fluid communication between said first and second fluid interchange chambers.

15. A pressure balanced gate valve as recited in claim 14, wherein:

passage means is defined in said bonnet structure having one extremity thereof in communication with said first fluid interchange chamber and with the opposite extremity of said passage means in communication with said fluid transfer means.

16. A pressure balanced gate valve mechanism for controlling the flow of fluid, said valve mechanism comprising:

a valve body defining a valve chamber and forming inlet and outlet flow passages intersecting said valve chamber;

bonnet means forming a closure for said valve chamber;

gate means being movably positioned within said valve chamber and defining a port for registry with said flow passages in the open condition of said valve, said gate defining connection means at each extremity thereof;

seat means establishing seals between said gate means and said valve body about each of said flow passages;

actuator stem means defining inner and outer extremities and having the inner extremity thereof connected to one extremity of said gate means and extending in sealed relation through said bonnet means, said outer extremity defining an externally threaded portion;

internally threaded drive means is engaged with said externally threaded portion of said actuator stem;

retainer means is provided on said valve mechanism and retains said drive means in assembly therewith, said retainer means being movable to an inoperative position, allowing linear movement of said actuator stem and said drive means upon hydraulic energized movement of said gate means;

the threaded connection of said retainer means and said valve mechanism is of greater length than the length of normal gate travel during operation, and said retainer means is selectively positionable to allow sealing contact between said stop and back-face surface means of said bonnet and said stop and back-face seal means of said actuator stem at both the open and closed positions of said actuator means;

actuator means connected to said bonnet and being operative for imparting linear movement to said actuator stem means to cause opening and closing movement of said gate means;

pressure balancing stem means defining inner and outer extremities and having the inner extremity thereof connected to the other extremity of said gate means and extending in sealed relation at least partially through said valve body;

said bonnet means defining first closed chamber means surrounding the externally threaded portion of said outer extremity of said actuator stem;

said valve body defining second closed chamber means surrounding the outer extremity of said pressure balancing stem means;

pressure balancing fluid interchange means establishing fluid communication between said first and second closed chamber means.

17. A pressure balanced gate valve mechanism as recited in claim 16, wherein:

said bonnet structure defines said first closed chamber means; and said valve body defines a balancing stem passage receiving said balancing stem and being formed to define connection means, said interchange means being received by said connection means.

18. A pressure balanced gate valve mechanism as recited in claim 17, wherein:

said bonnet means defines said first closed chamber means and defines a first fluid connection;

said valve body defines a balancing stem passage and is formed to define a second fluid connection communicating with said balancing stem passage; and means defining a pressure balancing passage interconnecting said first and second fluid connections.

19. A pressure balanced gate valve mechanism for controlling the flow of fluid, said valve mechanism comprising:

a valve body defining a valve chamber and forming inlet and outlet flow passages intersecting said valve chamber;

bonnet means forming a closure for said valve chamber;

gate means being movably positioned within said valve chamber and defining a port for registry with said flow passages in the open condition of said valve, said gate defining connection means at each extremity thereof;

seat means establishing seals between said gate means and said valve body about each of said flow passages;

actuator stem means defining inner and outer extremities and having the inner extremity thereof connected to one extremity of said gate means and extending in sealed relation through said bonnet means, said outer extremity of said actuator stem means being externally threaded;

fluid energized actuator means connected to said bonnet and being operative for imparting linear movement to said actuator stem means to cause opening and closing movement of said gate means;

internally threaded drive means is engaged with said externally threaded portion of said actuator stem;

retainer means is provided on said valve mechanism and retains said drive means in assembly therewith, said retainer means being movable to an inoperative position, allowing linear movement of said actuator stem and said drive means upon hydraulic energized movement of said gate means;

the threaded connection of said retainer means and said valve mechanism is of greater length than the length of normal gate travel during operation, and said retainer means is selectively positionable to allow sealing contact between said stop and back-face surface means of said bonnet and said stop and back-face seal means of said actuator stem at both the open and closed positions of said actuator means;

pressure balancing stem means defining inner and outer extremities and having the inner extremity thereof connected to the outer extremity of said gate means and extending in sealed relation at least partially through said valve body; and means for inducing linear movement to said pressure balancing stem and gate exclusive of said actuator means.

20. A pressure balanced gate valve mechanism as recited in claim 19, wherein:

said threaded connection of said retainer means allows linear movement of said actuator stem by a distance at least as great as the distance of linear movement between open and closed positions during normal operation.

21. A pressure balanced gate valve mechanism as recited in claim 20, wherein:

said bonnet means defines back-face surface means;

said actuator stem defines back-face seal means for sealing engagement with said back-face surface means.

22. A pressure balanced gate valve mechanism as recited in claim 20, wherein:

said bonnet means defines first back-face surface means and said valve body defines second back-face surface means;

said actuator stem defines first back-face seal means for sealing engagement with said first back-face surface means;

said pressure balancing stem means defining second back-face surface means for sealing engagement with said second back-face surface means; and said first back-face seal means engages said first back-face surface means and forms a seal therewith at one of the open and closed positions of said gate means, said second back-face seal means establishes sealing engagement with said second back-face surface means at the other one of the open and closed positions of said gate means.

23. A pressure balanced gate valve mechanism as recited in claim 19, wherein said stem actuator means comprises:

a linear hydraulic actuator being connected to said bonnet means and having internal piston means connected to the outer extremity of said actuator stem; and said hydraulic actuator being linearly movable relative to said bonnet means to achieve immobilization of said hydraulic actuator.

24. A pressure balanced gate valve mechanism as recited in claim 23, wherein:

a hydraulic connection is provided on said valve body means in communication with the outer portion of said pressure balancing stem passage; and a second hydraulic conduit is connected to said hydraulic connection for supplying and receiving hydraulic fluid during operation of said valve mechanism.

25. A pressure balanced gate valve mechanism as recited in claim 23, wherein:

said bonnet means and said piston means cooperating to define variable volume closed chamber means receiving at least a part of the outer portion of said actuator stem means; and said pressure balancing stem cooperating with said body means to define second variable volume chamber means.

26. A pressure balanced gate valve mechanism as recited in claim 19, wherein said stem actuator means comprises:

a linear hydraulic actuator being connected to said bonnet means and having internal piston means connected to the outer extremity of said actuator stem; and hydraulic conduit means being connected to said hydraulic actuator for supplying and receiving hydraulic fluid during operation of said valve mechanism, said inoperative position of said hydraulic actuator being achieved by disconnecting said hydraulic conduit from said hydraulic actuator.

* * * * *